United States Patent
Kilkki (12)

(10) Patent No.: US 6,219,351 B1
(45) Date of Patent: Apr. 17, 2001

(54) IMPLEMENTATION OF BUFFERING IN A PACKET-SWITCHED TELECOMMUNICATIONS NETWORK

(75) Inventor: Kalevi Kilkki, Espoo (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/301,377

(22) Filed: Apr. 27, 1999

Related U.S. Application Data

(63) Continuation of application No. PCT/FI97/00683, filed on Nov. 11, 1997.

(30) Foreign Application Priority Data

Nov. 15, 1996 (FI) .......................................... 964579

(51) Int. Cl.$^7$ .................................................. H04L 12/28
(52) U.S. Cl. ............................................. 370/412; 370/429
(58) Field of Search .................................... 370/395, 389, 370/396, 399, 378, 412, 413, 429

(56) References Cited

U.S. PATENT DOCUMENTS

| 5,390,176 | * | 2/1995 | Schoute | 370/395 |
| 5,553,061 | | 9/1996 | Waggener, Jr. et al. . | |
| 5,555,264 | | 9/1996 | Sallberg et al. . | |
| 5,867,663 | * | 2/1999 | McClure | 370/413 |
| 5,892,762 | * | 4/1999 | Okuda | 370/395 |
| 5,978,359 | * | 11/1999 | Caldara | 370/236 |
| 5,983,260 | * | 11/1999 | Hauser | 370/229 |
| 5,996,019 | * | 11/1999 | Hauser | 370/429 |

FOREIGN PATENT DOCUMENTS

| 0407161 | 1/1991 | (EP) . |
| 0 671 860 | 9/1995 | (EP) . |
| 0 715 436 | 6/1996 | (EP) . |
| 0715436 | 6/1996 | (EP) . |
| 2308959 | 7/1997 | (GB) . |
| WO 9219060 | 10/1992 | (WO) . |
| WO 9319551 | 9/1993 | (WO) . |
| WO 9717787 | 5/1997 | (WO) . |

* cited by examiner

*Primary Examiner*—Douglas Olms
*Assistant Examiner*—Ricardo M. Pizarro
(74) *Attorney, Agent, or Firm*—Altera Law Group, LLC

(57) ABSTRACT

The invention relates to a method for implementing buffering in a packet-switched telecommunications network. In the method, incoming data units are received and stored in a logical queue in a buffer (BF) comprising a plurality of memory locations, and data units are read out from the memory location (FML) at the head of the queue at a predetermined rate. In order to eliminate delay variations over desired connections by as simple a method as possible, the traffic is divided into at least two different classes in such a way that (a) the data units of one class are stored in the first free memory location starting from the head of the queue in each case, (b) feed points (FP; FP1 ... FP3) are provided for the other classes at predetermined points in the middle of the queue formed by the memory locations, one for each of the other classes, and (c) a data unit belonging to one of said other classes is stored in the feed point for said class when the memory location associated with said feed point is free, and in the first free memory location after the feed point in the queue when the memory location associated with said feed point is reserved.

8 Claims, 4 Drawing Sheets

IMPLEMENTATION OF BUFFERING IN A
PACKET-SWITCHED
TELECOMMUNICATIONS NETWORK

This application is a continuation of PCT/FI97/00683 files Nov. 11, 1997.

FIELD OF THE INVENTION

The present invention relates to implementation of buffering in a packet-switched telecommunications network, particularly in an ATM network wherein the packets to be transferred have a constant length.

BACKGROUND OF THE INVENTION

To aid the understanding of the following description, some terms to be used later will first be defined.

A switching matrix is comprised of a plurality of switching elements which are generally identical and are interconnected according to a given topology. In the literature of the art, such a switching matrix may also be called a "switching network", since the switching elements form a network having the given topology. Hence, a switching matrix is considered to have a defined form when its switching elements and their interconnections are known.

Switching elements may be treated as the elementary "building blocks" from which the switching matrix is constructed by connecting a plurality of similar switching elements into a network.

The term switch is used to denote the entity configured about a switching matrix. Hence, a switch can denote any means employed for signal switching in a communications network. In the present context, a switch is a packet switch as the invention is related to buffering in a packet-switched telecommunications network, particularly in an ATM network.

ATM (Asynchronous Transfer Mode) is a connection-oriented packet-switching technique, which has been selected by the international organization for telecommunications standardization, ITU-T, as the target transfer mode solution for implementing a broadband multimedia network (B-ISDN). In an ATM network, the problems of conventional packet-switched networks (such as X.25 networks) are overcome by transmitting short packets of a constant length (53 bytes) called cells. Each cell comprises a 48-byte payload portion and a 5-byte header. Further discussion of an ATM network herein will be omitted as non-essential subject to the understanding of the invention. When required, a closer description of this topic can be found in international standards and textbooks of the art.

FIG. 1 shows schematically an ATM switch seen from the outside. The switch has n input ports $I_1 \ldots I_n$ and m output ports $O_1 \ldots O_m$. A cell stream CS is present at each port of the ATM switch 11. The header of an individual cell in the data stream is denoted by symbol HD. In the ATM switch, the cells are switched from the input port $I_i$ to the output port $O_j$, and simultaneously the value of the cell header is translated from an incoming value to an outgoing value. For this purpose, the switch includes a translation table 12 by means of which said header translation is made. From the table can be seen that, for example, all the cells received at input port $I_1$, and having a header with a value X are switched onto output port $O_1$, whereby the header of the outgoing cells is simultaneously given the value K. Cells present on different input ports may have headers of equal value; for example, cells received at input port $I_n$ with the same header value X are also switched onto output port $O_1$, but their header is given the value J on the output port.

Hence, the main tasks of a switch are: state switching (switching from the input port to the desired output port, i.e. routing) and "header switching", that is, header translation. Occasionally, as is also evident from the figure, two cells may be simultaneously contending for access onto the same output port. For this purpose, the switch must have buffering capacity to avoid the necessity of discarding cells in such a situation. Hence, the third main task of a switch is to provide buffering.

The present invention specifically relates to implementation of buffering. Since the invention is intended for an ATM network in particular, the method will be applied primarily in the switching elements of an ATM switch.

Traffic sources generating both constant bit rate (CBR) data and variable bit rate (VBR) data can be connected to an ATM network. The ATM network causes cell delay variation (CDV) on cells passed via these connections. In the case of variable-rate traffic sources in particular, a high delay variation poses synchronizing problems at the receiver. In other words, the original rate variation at the receiving end is very difficult to determine after the network has caused delay variations on the transmitted signal. Equalization of excessive rate variations also requires a high buffering capacity at the receiver.

The known methods for equalizing ATM network-induced delay variations are mainly based on applying delay priorities. The connections are classified into different classes according to their CDV requirements, and dedicated buffers are reserved for connections with stringent CDV requirements. Such buffers have a higher priority than those for other connections, which means that all cells on such buffers are forwarded before cells on any lower-priority buffer are sent. Hence, the first cell on a lower-priority buffer will not be forwarded until the higher-priority buffer is empty.

One drawback of the above known solutions is that the hardware configuration will be the more complex the greater the number of parallel buffers. This drawback is highlighted particularly when the switch comprises a plurality of switching stages, which likewise results in a high number of switching elements and buffers.

SUMMARY OF THE INVENTION

It is an object of the present invention to eliminate the drawbacks described above and to provide a solution wherewith the delay variation can be maintained within desired limits with a very simple buffering arrangement.

This object is achieved with a solution as defined in the independent claims.

The idea of the invention is to utilize a FIFO-type buffer through which "normal traffic" (i.e., traffic not critical with respect to delay variations) is fed through on the conventional FIFO principle. In addition to this "normal traffic", part of the traffic is classified as critical with respect to delay variations. For each of such classes, there is a dedicated feed point at a given location at the centre of the buffer, to which the incoming cell is fed as far as possible. Hence, the idea is to feed in each case a cell of a given class as close to a predetermined fixed point in the buffer queue as possible, regardless of how many memory locations will possibly remain empty between the cell to be fed to said point and the current last cell in the queue.

On account of the solution of the invention, the buffer is simple to manage, as after the cell has been written into the buffer, the buffer operates as a conventional FIFO buffer. Thus, the reading mechanism is as simple as possible; a cell is read out from the memory location at the head of the queue in each outbound time slot, and the stored data units are moved forward towards the memory location at the head of the queue after each individual reading operation.

In accordance with the preferred embodiment of the invention, the buffering is implemented on the output of the ATM switching element, and the buffer only utilizes two traffic classes: "normal traffic" that is not critical with respect to delay variations, and a class defined as critical with respect to delay variations. "Normal traffic" utilizes the buffer on the FIFO principle, that is, a cell is stored in each case in the first empty memory location starting from the head of the queue.

BRIEF DESCRIPTION OF THE DRAWINGS

The invention and its preferred embodiments will be described more closely in the following with reference to examples in accordance with FIGS. 2–7 in the accompanying drawings, in which.

DETAILED DESCRIPTION OF THE INVENTION

Figure 1:
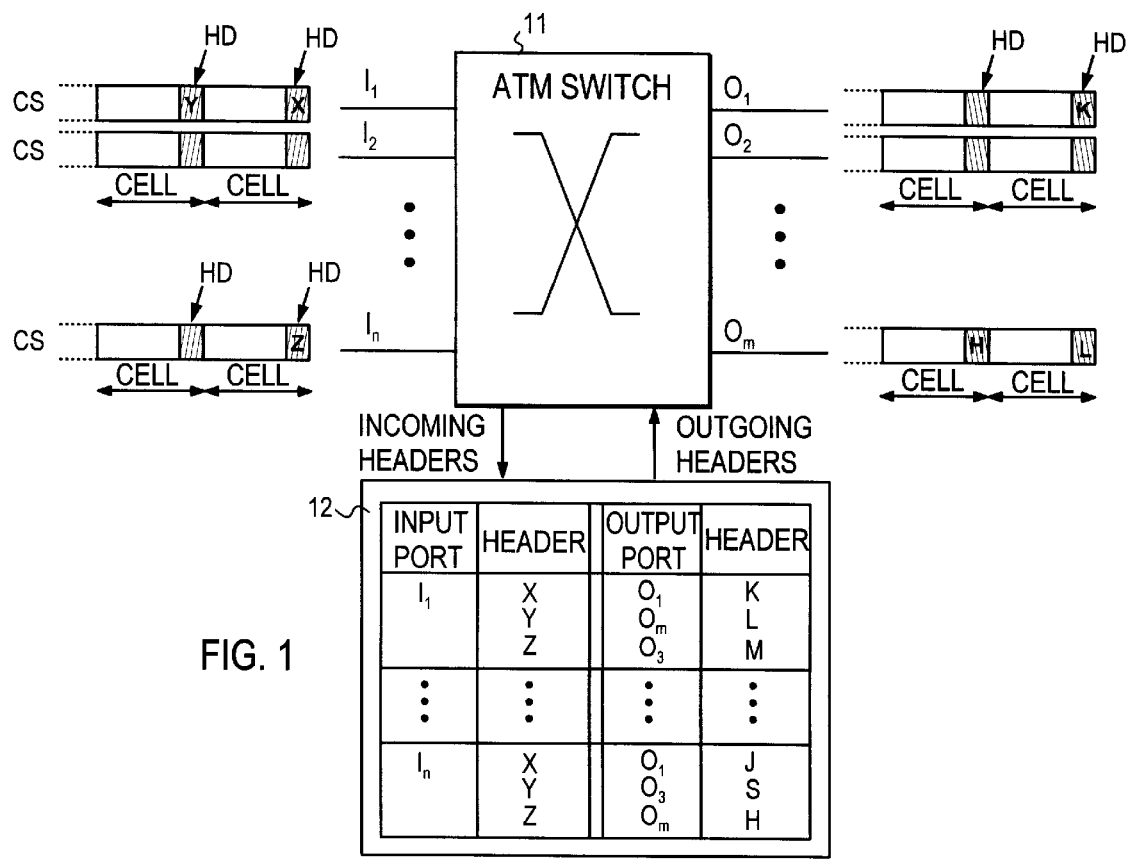
FIG. 1 illustrates schematically an ATM switch.
Figure 2:
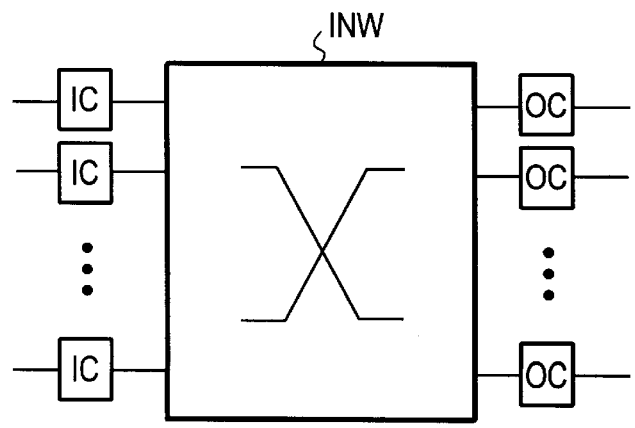
FIG. 2 illustrates a switching element in an ATM switch.

FIG. 2 illustrates the generic structure of a switching element in an ATM node or switch. On the input port of the switching element, the routing information included in the incoming cell is analyzed, and the cell is switched onto the correct output. For this purpose, the switching element includes a discrete input controller IC for each input port. The switching element further comprises an output controller OC for each output port. The output controller sends the cells out from the switching element. An interconnection network INW interconnects the input controllers and output controllers. In order for the cell loss probability not to become too high in internal contention situations (several cells contend for the same output in the same time slot), the switching element must also include buffers. Such buffers are typically provided at least in the output controllers OC.

Figure 3:
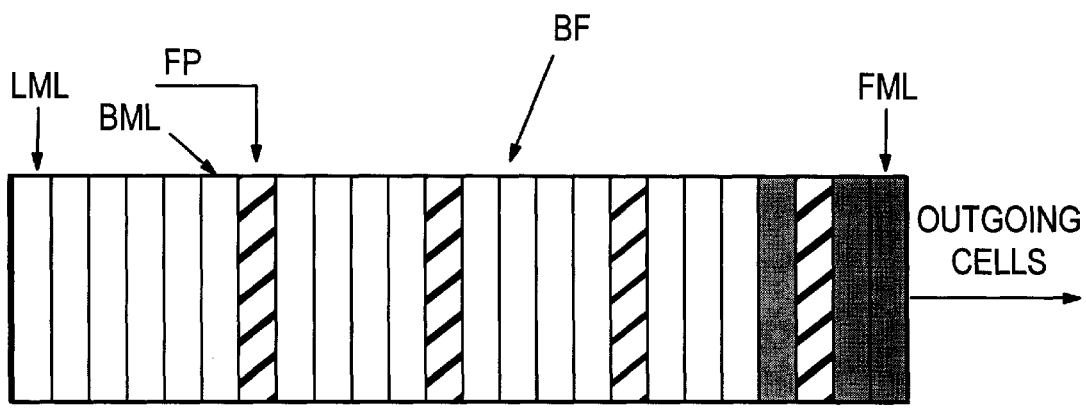
FIG. 3 illustrates a buffer wherein the method of the invention is employed.

FIG. 3 shows one such buffer BF in which the method of the invention is employed. In this exemplary case, inbound traffic has been classified into two classes in accordance with the CDV requirements: "normal traffic" that is not critical with respect to delay variations, and traffic that is critical with respect to delay variations. The former will be termed Class A and the latter Class B in the following. In FIG. 3, each memory location in the buffer has been denoted by a vertical bar. The cells enter from the left-hand side, and for each outbound time slot the content of the first memory location FML at the head of the buffer is read and the cell contained therein is sent out from the buffer (if there was a cell in that memory location). After each reading operation, the cells are moved forward one memory location (to the right).

FIG. 3 shows an arbitrary momentary situation by denoting those memory locations that include Class A cells with gray and those memory locations that include Class B cells with hatched lines. Unfilled vertical bars represent empty memory locations. For Class B, a fixed feed point FP is defined at the centre of the buffer; a cell of Class B is fed to this feed point whenever said memory location is free. If this memory location is not free, the cell is fed to the first free memory location from the feed point towards the end of the buffer. If, for example, in the situation shown in FIG. 3 a new cell of Class B enters the buffer, it is fed to the memory location denoted by reference BML. Class A cells, on the other hand, are always fed to the first free memory location. If only Class A cells enter the buffer, the buffer behaves exactly as a conventional FIFO buffer.

Figure 4:
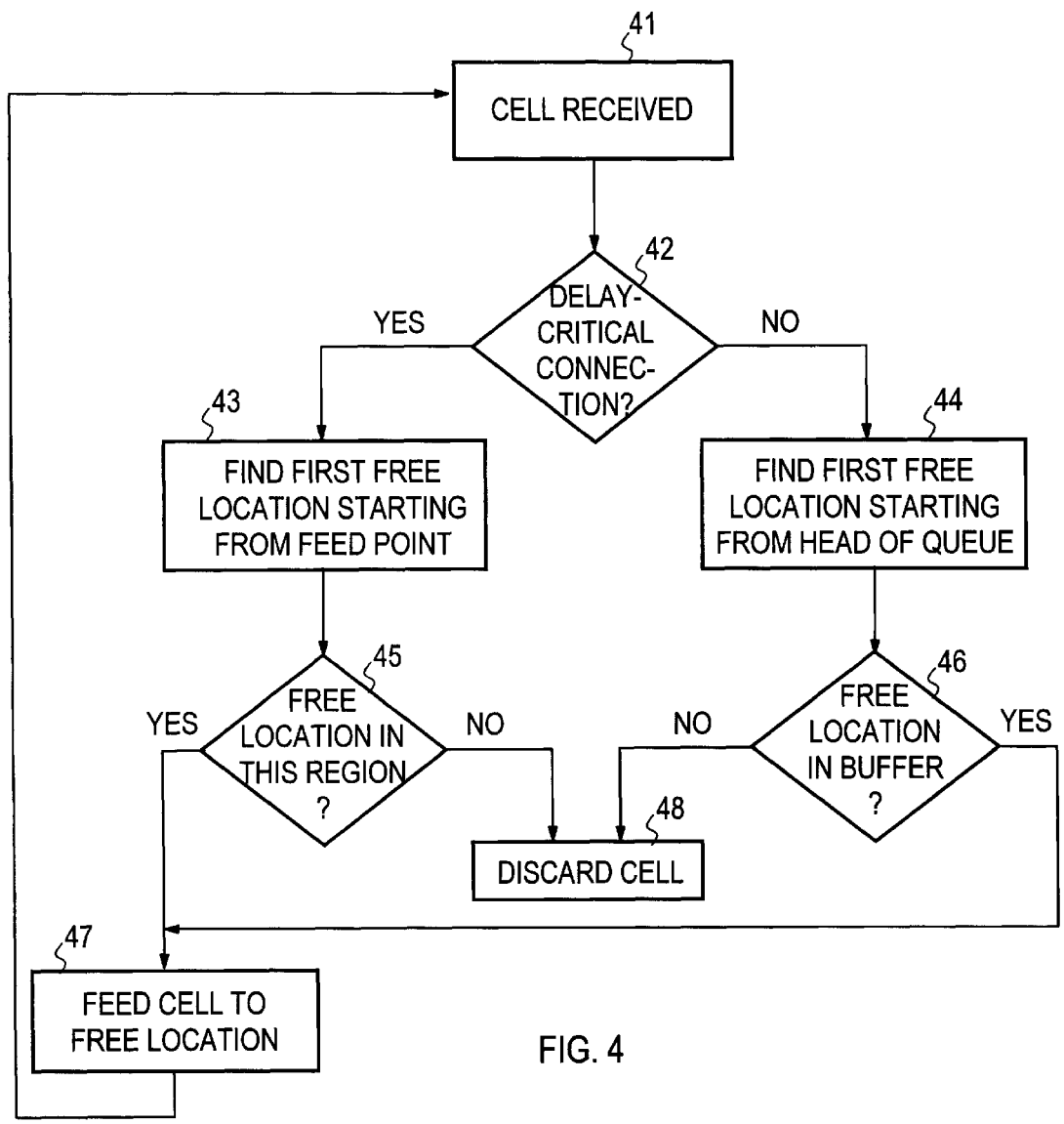
FIG. 4 is a flow chart illustrating operations carried out on the input side of the buffer.

Two separate processes are involved in the management of the buffer BF: a writing process and a reading process. FIG. 4 is a flow chart illustrating the course of a writing process in accordance with the invention. When a cell is received in the buffer (step 41), it is first studied from the cell header (step 42) whether a cell critical with respect to delay variation is concerned (connection having Class B traffic). If it is found that the cell is not such a cell (but belongs to Class A), the first free memory location starting from the head of the queue (from the first memory location FML) is sought from the buffer (step 44). As a result of the search, either a first free memory location or no free memory location is found, and hence it is known in step 46 whether there is a free memory location in the buffer. If no free memory location was found as a result of the search, the cell is discarded (step 48). If a memory location was found, the cell is stored in that memory location (step 47).

If it is found in step 42 that a cell critical with respect to delay variation is concerned, the first free memory location starting from the feed point (FP) for said class is sought. As a result of the search, either a free memory location is found in the region delimited by the memory location corresponding to the feed point FP and the last memory location LML in the buffer, or no free memory location is found in said region. If a free memory location was found in said region, the cell is fed to said memory location (step 47). Otherwise the cell is discarded (step 48).

The above procedure can be varied for Class A for example in such a way that the search for a free memory location is not extended to the entire buffer but is terminated at the feed point FP, for instance.

Figure 5:
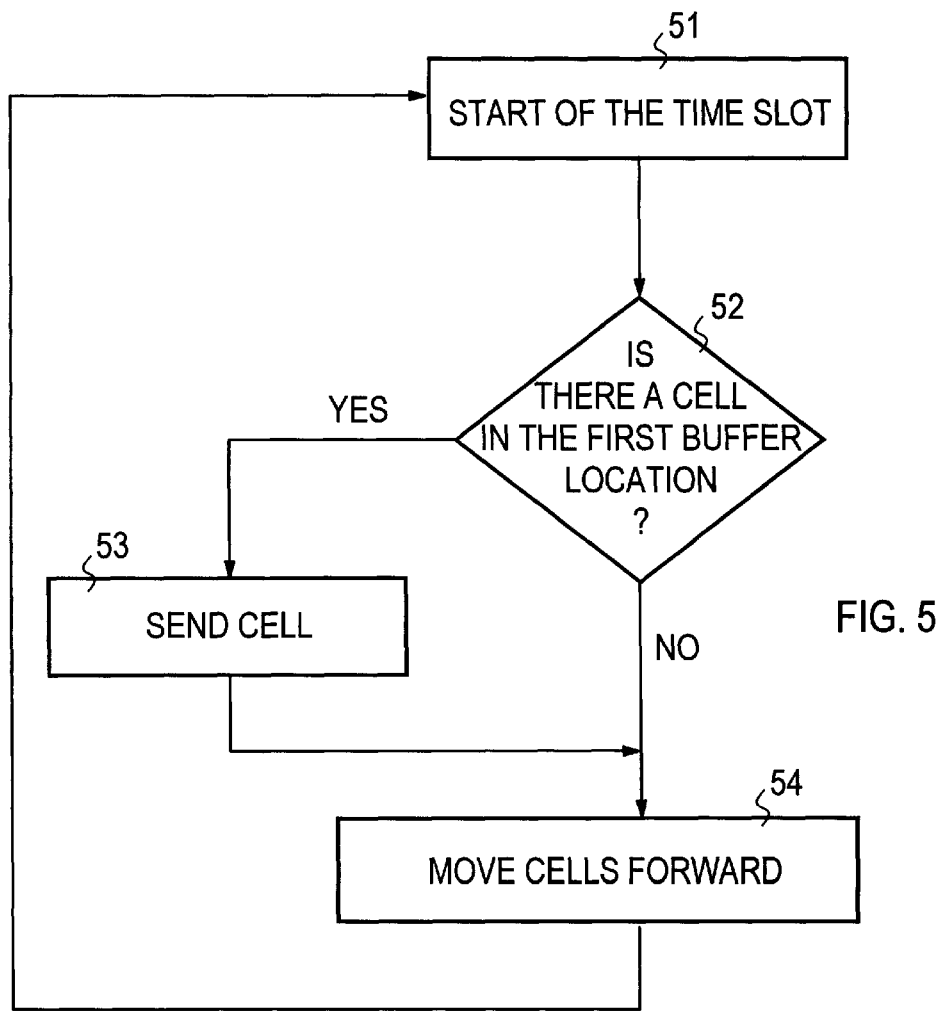
FIG. 5 is a flow chart illustrating operations carried out on the output side of the buffer.

FIG. 5 is a flow chart illustrating the course of the reading process. In each outbound time slot, it is tested (step 52) whether there is a cell in the first memory location FML of the buffer. If a cell is found, it is sent forward (step 53). After the sending, or testing if no cell was found, all cells are moved forward one memory location in the buffer (step 54). Thereafter the method proceeds to awaiting the next time slot, in which the above procedure is repeated. As will be seen from the figure, the reading process fully corresponds to the reading process in a FIFO buffer.

It should further be noted that the buffer need not necessarily be implemented in the form of a physical queue in which all cells are continually moved forward, but it may be implemented for example with pointers. In such a case, one pointer may point to the head of the queue, and each subsequent memory location may contain a pointer pointing to the location of the next cell in the queue. The cells form a logical queue, however, and cells are read out from the head of the queue at a given rate. Furthermore, what is essential is that the feed point for a given class has a fixed temporal position relative to the head of the queue where the reading is performed. In other words, the time required to move a cell fed at the feed point out from the buffer is essentially constant.

Figure 6:
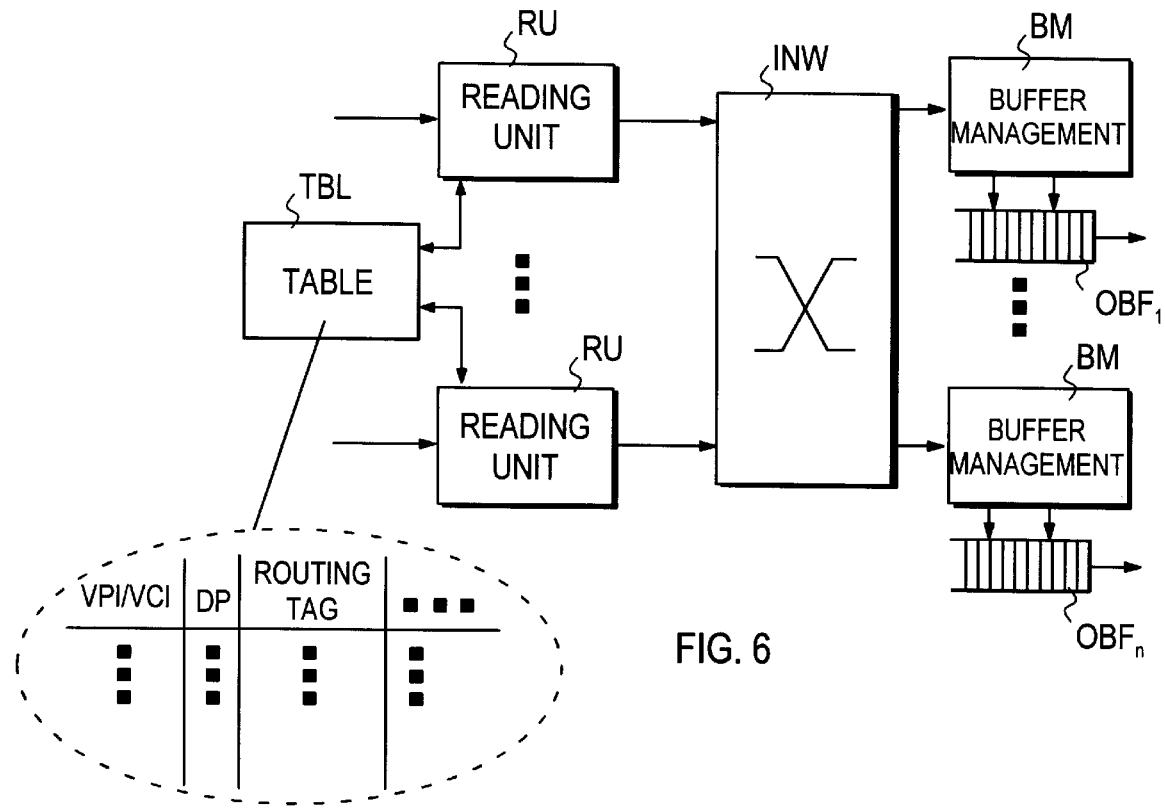
FIG. 6 presents a functional block diagram of a switching element of the invention.

FIG. 6 shows a functional block diagram of a switching element in accordance with the invention. The example relates to a switching element at the input edge of the switch. The input controllers in this case comprise a reading unit RU at each input port and a table TBL common to all reading units. The table contains different parameters for each VPI/VCI identifier, said parameters being set at the connection set-up phase. The reading unit reads the VPI/VCI identifier of each incoming cell and thereafter searches in the table e.g. the value of the delay parameter DP associated therewith. The delay parameter DP indicates whether the connection is critical with respect to delay variations or not. If in accordance with the above only two classes are utilized, one bit that is either set or not set is sufficient as a delay parameter. Moreover, the reading unit retrieves from the table the routing tag associated with said VPI/VCI identifier and inserts the delay parameter bit and the routing tag into the cell. The network INW switches the cell onto the correct output port according to the routing tag. In the output port, the cells are supplied to a buffer management unit $Bm_i$ (i=1...n), which manages the buffer $OBF_i$ ($_{i=}$1...n) of the corresponding output port in accordance with the procedure of FIGS. 4 and 5.

It should be noted that insertion of the routing tag and delay parameter into the cell is only carried out at the input edge of the switch; the switching elements in the later stages only read the routing tag and delay parameter attached to the cell.

Figure 7:
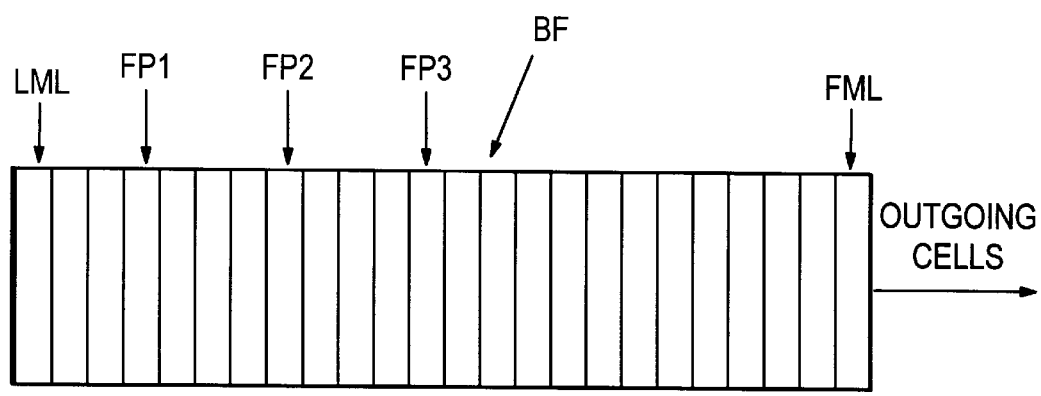
FIG. 7 illustrates a buffer wherein traffic critical with respect to delay variations has been classified into several classes.

If it is wished to classify the incoming traffic into more than two classes, that is, if more than one class "critical with respect to delay variations" is employed, the corresponding feed points are located in accordance with FIG. 7 in such a way that the feed point FP1 for the class most critical with respect to delay variations is located closest to the last memory location in the buffer, the feed point FP2 for the next most critical class with respect to delay variations is located next closest to the last memory location, etc. Hence, the feed point closest to the reading point is the one whose traffic is least critical with respect to delay variations. The feed point for "normal traffic" (Class A) still varies in the above-described known manner, i.e., the feed point is at the first free memory location in the queue that is encountered in proceeding in the queue from the first memory location towards the tail of the queue. If it is wished to follow the above variation for Class A, the search for a free memory location could be terminated for example at the first feed point (FP3) encountered.

With the solution in accordance with the invention, the maximum delay variation for a given connection can be reduced to a value corresponding to the time it takes for a cell to move from the last memory location in the buffer to the memory location corresponding to the feed point for the class concerned. Hence, the allowed maximum variation determines at which point in the buffer the feed point should preferably be set.

The highest permissible load that is caused by connections critical with respect to delay variations is also dependent on how many memory locations the buffer contains from the feed point to the end of the buffer. The call admission control (CAC) should take account of this "effective buffer size" in order that too many cells may not be lost.

In practice, the buffer normally has 100 . . . 200 memory locations. When only two classes are employed, the feed point FP (FIG. 3) is typically at such a point that the length of the feed region for Class B (length from feed point to the end of the buffer) is 10 . . . 30% of the total length of the buffer, preferably about 20% of the total length of the buffer.

The above presents a buffering arrangement in accordance with the invention, applied in connection with the output buffers of the switching elements. However, the solution can also be implemented in conjunction with switching elements provided with input buffers or a switching element provided with both input and output buffers. Output buffering is more advantageous e.g. for the reason that the "head-of-queue blocking" phenomenon is only encountered in the case of input buffering. (This phenomenon means that a cell bound for a given output cannot reach its own output even though it is the only cell bound for that output, because the preceding cell in the queue cannot reach its own output.)

The above principle can also be applied even though the buffering arrangement is changed from that presented above. The buffer may for example be ring-like. It is also possible that the queue is not moved forward, but the reading point is varied for each reading operation. In that case, also the feed point changes accordingly, so that its temporal distance to the reading point remains constant.

Even though the invention has been explained above with reference to the examples in accordance with the accompanying drawings, it is evident that the invention is not so restricted, but it can be varied within the scope of the inventive idea set forth in the appended claims. For example, in principle it is possible to use for delay-critical cells empty memory locations ahead of the feed point in the event that the memory location corresponding to the feed point is reserved and no free memory locations are found in the queue after the feed point either. However, in that case the cells may end up in a wrong order, and hence the receiving end must perform the resequencing thereof. A better alternative is to dimension the buffer such that the probability for no free memory location being found in the region after the feed point is sufficiently low. Neither is the method necessarily limited to use in conjunction with a switching element, but it may also be used in other parts of the network, e.g. in network terminals.

What is claimed is:

1. A method for Implementing buffering in a packet-switched telecommunications network, comprising:

incoming data units are received and stored in a logical queue in a buffer (BF) comprising a plurality of memory locations, and data units are read out from a first memory location (FML) at the head of the queue at a predetermined rate, wherein traffic is divided into at least two different classes in such a way that the data units of one class are stored in a first free memory location from the head of the queue in each case, feed points (FP, FP1 . . . FP3) are provided for classes other than the one class at predetermined points along the queue formed by the plurality of memory locations, one for each of the other classes, and a data unit belonging to one of said other classes is stored in a memory location at a feed point for said class when a memory location associated with said feed point is free, and in the first free memory location after said feed point in the queue when the memory location associated with said feed point is reserved.

2. A method as claimed in claim 1, wherein the traffic is divided into two classes, wherein there is only one predetermined feed point (FP) in the buffer.

3. A method as claimed in claim 1 wherein the traffic is divided into more than two classes and the feed points are located in such a way that the feed point for the class having the most stringent requirements with respect to delay variations is closest to the last memory location (LML) in the queue, and the feed point for the class having the least stringent requirements with respect to delay variations is closest to the first memory location (FML) in the queue.

4. A method as claimed in claim 2, wherein the distance from the feed point to the last memory location in the buffer is 10 . . . 30% of the total length of the buffer.

5. A method as claimed in claim 1, wherein if a memory location corresponding to the feed point is reserved and no free memory location is found in the queue after the feed point either, the cell is not forwarded.

6. A method as claimed in claim 1, wherein for said one class, the first free memory location is sought up to the last memory location in the buffer if needed.

7. A method as claimed in claim 1, wherein for said one class, a search for a free memory location is terminated at the first feed point (FP, FP3) if no free memory location has been found up to that point.

8. An arrangement for implementing buffering in a packet-switched telecommunications network, said arrangement comprising a buffer comprising a plurality of memory locations, data units stored in said memory locations forming a logical queue, output controller for reading the data units out from the buffer memory location at the head of the queue at a pre-determined rate, means and for recognizing the delay variation class of the cell entering the buffer, and a buffer manager for storing the cell in a first free memory location in the region between a feed point corresponding to a delay variation class of the cell and the end of the buffer.

* * * * *